Dec. 19, 1939.　　　M. F. PATTERSON　　　2,184,125
COLOR DEMONSTRATION APPARATUS
Filed Nov. 5, 1938　　　2 Sheets-Sheet 1

INVENTOR.
Mary F. Patterson.
BY
Chas. E. Townsend
ATTORNEY.

Dec. 19, 1939. M. F. PATTERSON 2,184,125
COLOR DEMONSTRATION APPARATUS
Filed Nov. 5, 1938 2 Sheets-Sheet 2

INVENTOR.
Mary F. Patterson.
BY
Chas. E. Townsend.
ATTORNEY.

Patented Dec. 19, 1939

2,184,125

UNITED STATES PATENT OFFICE 2,184,125

COLOR DEMONSTRATION APPARATUS

Mary F. Patterson, Berkeley, Calif.

Application November 5, 1938, Serial No. 239,013

5 Claims. (Cl. 35—26)

The present invention relates to an apparatus for displaying colors, and particularly to an apparatus for illustrating visibly the relationship and complementary associations of colors.

Of the many types of so-called color harmony charts now available, there is none which demonstrates all relationships of color value and intensity by their relative positions. By the term "value" used herein is meant illumination as measured by dark and light in color pigmentation. For example, any given color pigment is rendered lighter by illumination, and darker by the lack of illumination. Somewhere between the greatest lightness and greatest darkness is a value at which the color possesses its greatest brilliancy. This value of greatest brilliancy varies in its position on the scale of lightness and darkness for different colors, although the point of greatest brilliancy for any given color bears a definite relationship to the point of greatest brilliancy for each of the other colors. The term "intensity" as used herein is applied to variations in the tone of a color as it is affected by the addition to it of its complementary color, which tends to neutralize it, complete neutrality being colorless, or grey.

Such relationships, together with the complementary relationships of the colors themselves, may not readily be demonstrated on a chart produced on a plane surface. The present invention therefore provides for the visible demonstration of all these relationships on a three-dimensional apparatus.

It is the object of the present invention to provide an apparatus for displaying colors and for demonstrating the relationship of the colors displayed as to their different values and intensities, as well as the relationship of the pure colors to each other.

It is also an object of the present invention to provide an apparatus in which all of the primary, secondary and tertiary colors may be displayed in different values and intensities in such a manner that the positions occupied by the values and intensities will bear a definite and orderly relation to each other.

A further object of the invention is the provision of a three-dimensional apparatus for displaying colors in which the apparatus consists of separable segments to demonstrate the progression of color intensities which would be effected by combinations of colors displayed at opposite points on the exterior surface of the apparatus.

Further objects of the invention will be made apparent in the following specification wherein reference is made to the accompanying drawings in which—

Figure 1:
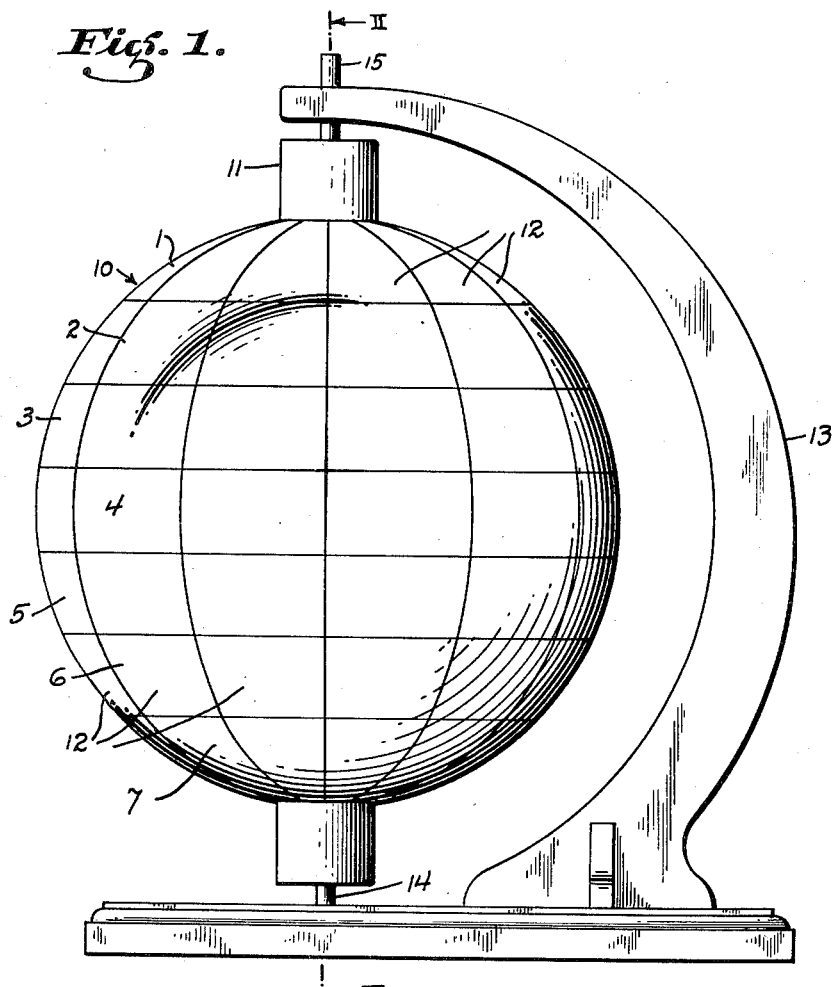
Fig. 1 is a side elevation of an apparatus embodying my invention.

The invention comprises a solid or three-dimensional object consisting of separable segments, the surfaces of which segments provide areas for the application of color in the form of paint. The solid is preferably, as shown in the drawings, of spherical shape and is built up on a central cylindrical pole piece around which are disposed segments formed by dividing the sphere in vertical radial planes.

Figure 4:
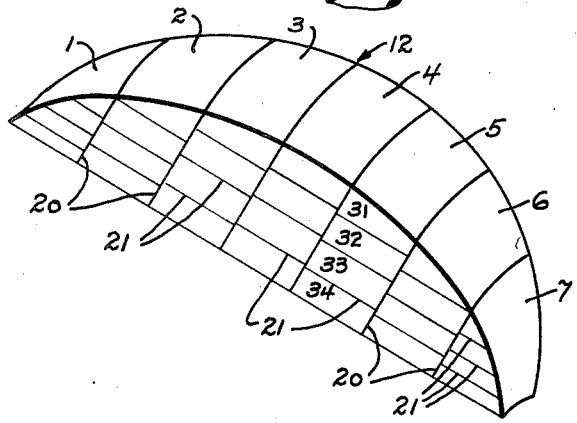
Fig. 4 is a perspective view of one segment of the segmental sphere which forms a part of the apparatus.
Figure 2:
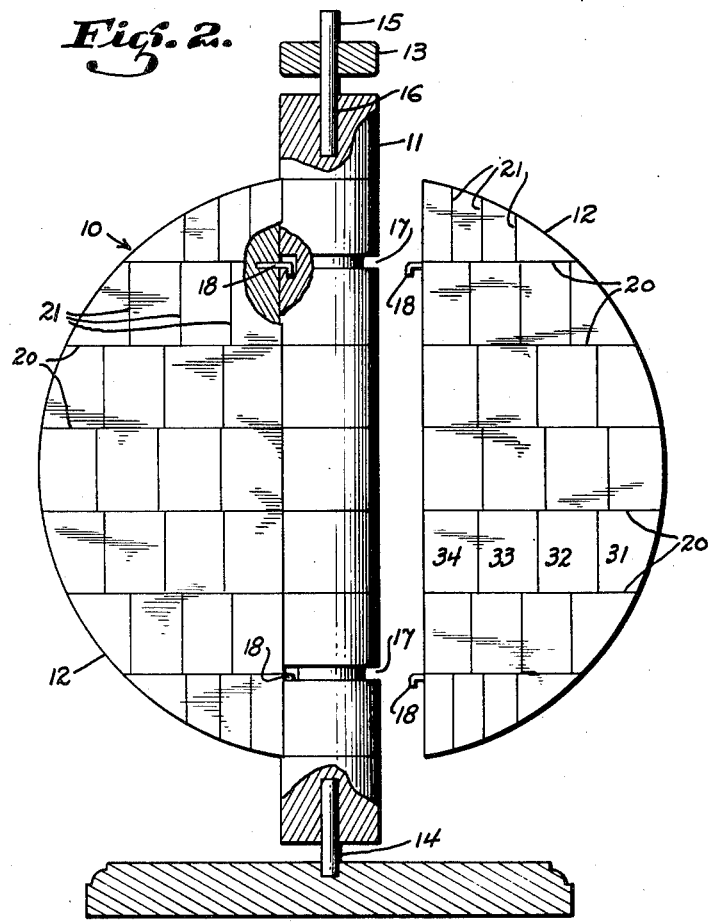
Fig. 2 is a sectional view taken on line II—II of Fig. 1.

Referring specifically to the drawings, the embodiment of the invention illustrated therein comprises a sphere generally indicated at 10, which includes the vertically extending cylindrical pole 11 and segments 12, as illustrated in Figs. 2 and 4. The pole 11 is supported for rotation in a suitable bracket 13 by means of a central pin 14 projecting from the lower end of the pole and into a suitable socket or bearing in the base portion of the bracket, and a similar pin 15 which is slidable through a bearing in the upper end of the bracket and which projects into a socket 16 in the upper end of the pole. This mounting permits rotation of the pole and also permits of its removal from the bracket, which may be accomplished by withdrawal of the pin 15.

The segments 12, of which there are twelve in number, are detachably secured to the pole 11. A suitable means for securing them in this manner is illustrated in Fig. 2, wherein the pole 11 is shown as having a pair of inwardly and downwardly projecting grooves 17 for the reception of angular projecting pins or hooks 18, a pair of which hooks is provided at the inner edge of each of the segments 12. As all of the segments are supported by means of their hooks 18 with their inner edges in abutment with the pole 11, they combine to form a complete sphere, as illustrated in Fig. 1.

The outer surfaces of the segments 12, or those surfaces which are exposed when the apparatus is completely assembled, are colored, each being a different color and the colors being arranged in their proper complementary order.

Figure 3:
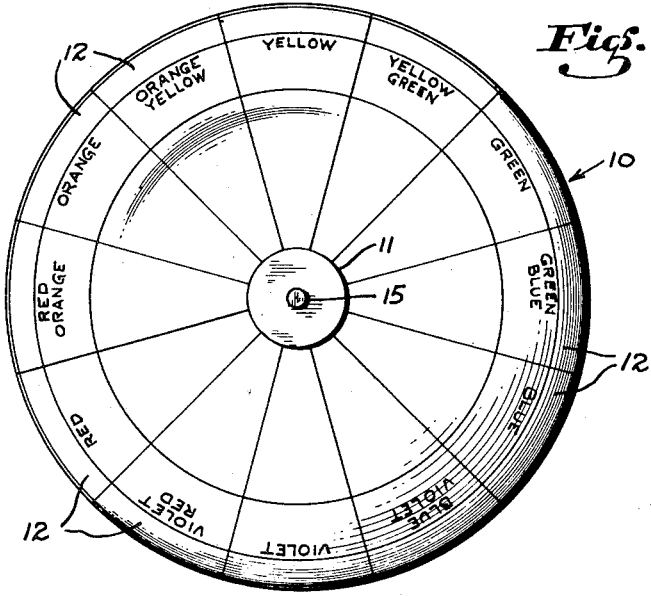
Fig. 3 is a plan view of the apparatus with the supporting bracket eliminated.

For example, three of these segments spaced 120° apart, as illustrated in Fig. 3 of the drawings, bear the primary colors: red, yellow and blue. Another three of the segments spaced 120° apart, and equally spaced from the primary colors, bear the secondary colors: orange, green and violet. The remaining six segments, which are arranged alternately with respect to the primary and secondary color elements, bear the tertiary colors in their proper order: red-orange, orange-yellow, yellow-green, etc. Thus, with the sphere in its assembled position, its exterior surface is divided into vertically extending areas of color, which areas represent all of the primary, secondary and tertiary colors in their proper relationship to each other.

These bands of color, which are, as stated, the outer surfaces of the segments 12, are divided by horizontal lines into seven approximately equal areas numbered 1 to 7 in Figs. 1 and 4, and on each of the segments the color carried thereby is represented in seven values varying from light to dark. The lightest value represented is reproduced in the space indicated at 1 near the top of the sphere, and the values grow progressively darker until the darkest value represented is reached, which is in the space indicated at 7 at the bottom of the sphere.

At some point in the scale of values of the colors thus represented, there is a value for each color which shows that color in what may be termed its greatest intensity or greatest brilliancy. The term "brilliancy" will be used herein to define this value as, although it may not be considered as properly descriptive, it is less confusing than the term "intensity" which is also used in reference to a scale which shows the approach of a color toward neutrality, or grey. This point of greatest brilliancy varies with different colors to a degree depending upon the spacing between the colors from the color yellow in the order in which they are represented in Fig. 3 of the drawings. For example, the greatest brilliancy of the color yellow appears high in the scale of values, or in the space 1. For yellow-green, the greatest brilliancy occurs in the space 2; for green, it occurs in the space 3, and for blue in the space 5. It follows that the point of greatest brilliancy for violet, which is diametrically opposite yellow, is at the bottom of the scale of values at the opposite side of the neutral pole. This point progresses upwardly again toward yellow in the arrangement illustrated in Fig. 3. Thus the outer spherical surface of the apparatus not only shows all of the primary, secondary and tertiary colors, but displays these colors in their proper relative positions and demonstrates the relative positions of the most brilliant values of these colors in compactly arranged value scales.

The side walls of the individual segments 12 are divided in a manner to display color intensities with relation to a neutral which is theoretically colorless, or grey. This is accomplished, as illustrated in Figs. 2 and 4, by dividing the side walls of the segments with horizontal parallel lines 20 which are coextensive with the lines which form the value scale on the outer surface of the segments, and by dividing each of the seven bands formed by these horizontal lines 20 by vertical lines 21, thus providing in each band four substantially equal areas on each side of the segment as, for example, the areas 31, 32, 33 and 34 for the display of progressively varying intensities of the color and value displayed in the corresponding area on the exterior surface of the segment.

Neutrality of a color is obtained by mixing with that color its complement. Thus, the side walls of the yellow segments will display scales which represent the progression of yellow from its full intensity toward neutral or grey such as is effected by mixing increasingly great amounts of violet pigment with the yellow. Conversely, the side walls of the violet segment will display a similar scale illustrating the progression of violet toward grey as increasingly great amounts of yellow are mixed with the violet. The same is true for all diametrically disposed segments, taking them in the order in which they are illustrated in Fig. 3. The horizontal lines 20 on the side walls of the segments which, as has been stated, correspond to the horizontal lines on the exterior surface of the segments, serve to divide the intensity scale in such a manner that not only will a single value of each color be illustrated in its progression toward grey, but each of the values represented on the exterior surface of the segments will be so illustrated.

The central pole piece 11 bears a definite relationship both to the values of colors displayed on the exterior of the sphere and to the different intensities of colors displayed on the sides of the segments. With respect to the latter, the central pole piece represents neutrality and therefore displays grey. With respect to the former, the pole piece is utilized to display different values of grey as those values correspond to the different values of all colors of which grey is theoretically a composite. Consequently, the vertical pole 11 is divided into seven horizontally disposed circumscribing bands in which are displayed seven values of grey graduated from a light grey in the uppermost band within the sphere to a dark grey in the lowermost band within the sphere. A portion of the pole 11 projects above and a portion projects below the sphere and these portions display white, indicating the admixture of all color in light at the upper end, and black, indicating total absence of light at the lower end.

With the apparatus described above, all of the primary, secondary and tertiary colors may be displayed in a wide range of values and intensities and in a manner which clearly illustrates the relationship of the colors, values and intensities to each other and to neutrality.

While some features of the present invention, and particularly those features which may be considered the mechanical or physical parts thereof, are more or less specifically described herein, it is to be understood that the invention is not limited by this description but is limited only by the scope of the appended claims.

Having thus described my invention, what I claim and desire to secure by Letters Patent is:

1. A color demonstration apparatus which comprises a generally spherical apparently solid object built up of separable segments in which colors are displayed on the spherical surfaces of said segments, and scales of color intensity are displayed on the abutting surfaces of the segments in an order which demonstrates the relationship between opposed segments of the solid.

2. A color demonstration apparatus comprising a cylindrical pole supported for rotation, and a plurality of sphere segments removably attached to said pole to provide an apparently solid object of generally spherical shape, the surface of said pole bearing a scale of values of grey, the spherical surfaces of said segments bearing scales of values of various colors and the abutting surfaces of the segments bearing intensity scales varying from the color displayed on the spherical surface to the grey displayed on the pole.

3. A color demonstration apparatus which comprises a central vertical pole piece having inwardly and downwardly inclined grooves formed therein, a plurality of members presenting surfaces for the application of color and adapted to surround said pole piece and to form therewith an apparently solid object, each of said members having pins projecting therefrom for engagement in said grooves whereby they will be separably supported with respect to the pole piece.

4. A color demonstration apparatus which comprises an apparently solid object divisible into segments along radially extending centrally converging planes, each of said segments bearing a different color in a scale of values on its exterior surface and the same color in a scale of intensities on said converging planes.

5. A color demonstration apparatus which comprises a spherical apparently solid object divisible into segments along radially extending centrally converging planes, each of said segments bearing a different color in a scale of values on its spherical surface and the same color in a scale of intensities on its plane surfaces the intensity scales on the plane surfaces progressing radially inwardly toward neutrality.

MARY F. PATTERSON.